United States Patent [19]
Hayashi

[11] 3,938,076
[45] Feb. 10, 1976

[54] VEHICLE TIRE PRESSURE SENSING DEVICE

[75] Inventor: Tadashi Hayashi, Yokosuka, Japan

[73] Assignee: Nissan Motor Co., Ltd., Yokohama, Japan

[22] Filed: Mar. 5, 1974

[21] Appl. No.: 448,519

[30] Foreign Application Priority Data
Mar. 6, 1973  Japan.................. 48-25699

[52] U.S. Cl. ............. 340/58; 73/146.3; 200/61.25; 200/83 A; 340/57
[51] Int. Cl.².................. B60C 23/00; H01H 35/24
[58] Field of Search ................ 340/58, 60, 240, 57; 200/61.25, 83 A, 83 J, 83 N, 83 Q, 83 P, 83 S; 73/146.3, 146.5, 146.8

[56] References Cited
UNITED STATES PATENTS

| | | | |
|---|---|---|---|
| 2,655,573 | 10/1953 | Szwargulski et al. | 200/83 J |
| 3,093,812 | 6/1963 | Brown | 340/58 |
| 3,155,938 | 11/1964 | Meyers | 340/58 |
| 3,296,395 | 1/1967 | Fraser | 200/83 A |
| 3,501,959 | 3/1970 | Womack | 200/83 J |
| 3,710,314 | 1/1973 | Bell et al. | 340/58 |
| 3,860,772 | 1/1975 | Byrd | 200/83 N |
| 3,864,537 | 2/1975 | Fiore | 200/83 S |

FOREIGN PATENTS OR APPLICATIONS
511,958  4/1955  Canada ................. 200/61.25

*Primary Examiner*—John W. Caldwell
*Assistant Examiner*—Joseph E. Nowicki

[57] ABSTRACT

A casing is disposed in an air pressure chamber of a pneumatic tubeless tire and carries therein a switch cooperating with an alarm to produce an alarm signal upon a fall in the air pressure in the tire below a predetermined value. The switch is controlled by a leaf spring which is deformable by the movements, in one direction, of a flexible diaphragm deformable in response to variations in the air pressure in the tire. The leaf spring is returnable by its resilient force upon the movements, in another direction, of the diaphragm. The casing is fixedly mounted on a wheel rim through a projection extending outwardly of the tire from the casing through the rim.

4 Claims, 4 Drawing Figures

VEHICLE TIRE PRESSURE SENSING DEVICE

The present invention relates to a tire pressure sensing device responsive to the air pressure in a pneumatic tire for producing an alarm signal when the air pressure in the tire falls below a normal value.

It is an object of the invention to provide a tire pressure sensing device which is adapted to susceptibly and securely sense a fall of the air pressure in a pneumatic tire below a normal value to produce an alarm signal.

It is a further object of the invention to provide a tire pressure sensing device which is adapted to automatically cease producing an alarm signal when the air pressure in a pneumatic tire reaches a normal value by supplementing air into the tire.

It is a still further object of the invention to provide a tire pressure sensing device which is adapted to produce an alarm signal when the air pressure in a pneumatic tire is below a predetermined value higher than a normal value, where a vehicle equipped with the tire moves at high speeds or the temperature of air in a pneumatic tire is abnormally increased.

It is a still further object of the invention to provide a tire pressure sensing device in which stationary and movable contacts of switch means are adapted to be kept from foreign substances such as moisture and dust in the outside atmosphere.

Further objects and advantages of the invention will become more apparent from the following detailed description taken in connection with the accompanying drawings in which.

Figure 1:
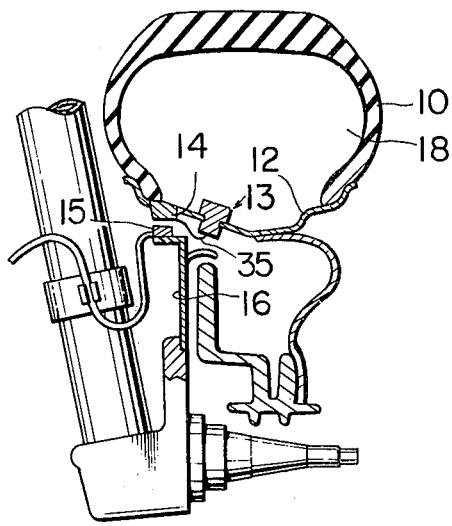
FIG. 1 is a schematic view, partly in cross section, of a portion of a vehicle equipped with a tire pressure sensing device according to the invention.

Referring now to FIG. 1, there is shown a pneumatic tubeless tire 10 of a vehicle wheel, a wheel rim 12 cooperating with the tire 10, a tire pressure sensing device 13 according to the invention which is fixedly mounted on the rim 12, a movable coil 14 fixedly secured to the rim 12 at the exterior of the tire 10 and electrically connected to the tire pressure sensing device 13, and a stationary coil 15 fixedly secured to a stationary part 16 of a vehicle body so as to be opposite to the movable coil 14 once at every one revolution of the tire 10. The tire 10 is supplied with air under pressure through a valve (not shown) mounted on the rim 12. The tire pressure sensing device 13 is responsive to the air pressure in the tire 10 for producing an alarm signal when the air pressure in the tire 10 falls below a normal value.

Figure 2:
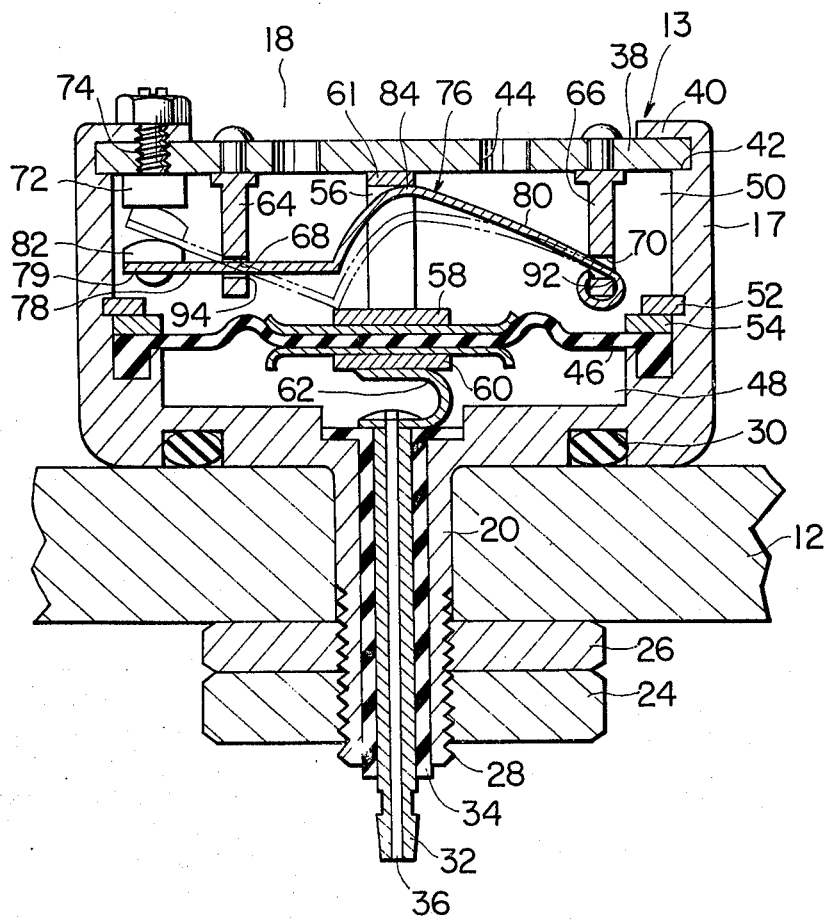
FIG. 2 is a schematic cross sectional view of a preferred embodiment of a tire pressure sensing device according to the invention.

Referring to FIG. 2, the tire pressure sensing device 13 is shown to comprise a casing 17 which is located in the interior or a pressurized air chamber 18 of the tire 10. The casing 17 has formed on one end thereof a threaded projection 20 extending outwardly of the pressurized air chamber 18 of the tire 10 through the rim 12 and is rigidly mounted on the rim 12 through the projection 20 and a nut 24 and a lock nut 26 attached to a threaded portion 28 of the projection 20. Other suitable fastening means may be employed for preventing the threaded portion 28 of the projection 20 from loosening, in place of the nut 24 and lock nut 26. A seal or O-ring 30 is provided for making an air-tight joint between the casing 17 and the rim 12 in cooperation with the nuts 24 and 26. An electrically conductive rod 32 extends through the casing 17 and projection 20 and is electrically insulated from those by an insulator member 34 interposed between the casing 17 and projection 20 and the rod 32. The rod 32 is electrically connected through a conductive wire 35 to the movable coil 14 mounted on the rim 12, as shown in FIG. 1 and has formed therethrough a passage 36. A cover plate 38 is provided at an open end (no numeral) of the casing 17 and is fixedly fastened along its edges to the casing 17 as shown by suitable fastening means such as a flange 40 and a shoulder 42 formed on the casing 17 and clamping the edges of the cover plate 38 therebetween. The cover plate 38 is made of a suitable electrical insulating material and has formed therethrough holes 44. The interior of the casing 17 is divided by a flexible partition member or diaphragm 46 into an atmospheric chamber 48 and a pressure chamber 50. The atmospheric chamber 48 is vented to the atmosphere through the passage 36 formed in the rod 32. The pressure chamber 50 communicates with the pressurized air chamber 18 of the tire 10 through the holes 44 formed in the cover plate 38. The diaphragm 46 is fixedly fastened along its edges to the casing 17 through suitable fastening means such as an annular snap ring 52 and an annular spacer 54 and is deformable in response to variations in the air pressure in the pressure chamber 50 and accordingly the pressurized air chamber 18 of the tire 10. The diaphragm 46 may be made of an electrical insulating material. A bracket 56 is fixedly mounted at one end thereof on the diaphragm 46 through a pair of plates 58 and 60 which clamp the diaphragm 46 therebetween so that it is movable together with the diaphragm 46. The plates 58 and 60 are electrically connected to each other. The bracket 56 has formed at the other or a free end thereof a flange 61 which extends perpendicularly to a longitudinal axis of the bracket 56. The flange 61 of the bracket 56 is engageable with the cover plate 38 as shown in FIG. 2. Biasing means such as a loop or U-shaped leaf spring 62 is disposed in the atmospheric chamber 48 and biases the diaphragm 46 and the bracket 56 toward the cover plate 38 against the effect of air pressure pushing the diaphragm 46 toward the rim 12. A compression coil spring may be employed in lieu of the loop spring 62. The cover plate 38 serves as a stop member which limits the upward movement in the drawing of the diaphragm 46 and bracket 56 effected by the action of the loop spring 62. The loop spring 62 is electrically connected to the rod 32. Two posts 64 and 66 are disposed in the pressure chamber 50 and are spaced apart from each other. Each of the posts 64 and 66 is fixedly secured at one end thereof on the cover plate 38. The posts 64 and 66 have formed at the other ends thereof apertures 68 and 70, respectively. A stationary contact member 72 is disposed in the pressure chamber 50 and is fixedly mounted on the cover plate 38 adjacent to an edge thereof. The stationary contact 72 is electrically connected to the flange 40 of the casing 17 through a screw 74. A leaf spring 76 is disposed in the pressure chamber 50. The leaf spring 76 comprises a flat section 78 which is rockably received at an approximately central portion thereof in the aperture 68 of the post 64 and which has a free end 79 and a curved section 80 of a sickle-shaped cross section which is connected at one end thereof to the flat section 78 and which is received at the other end thereof in the aperture 70 of the post 66. A movable contact member 82 is fixedly mounted on the free end 79 of the flat section 78 and is engageable with the stationary contact 72. The leaf spring 76 has a first position to disengage the movable contact 82 from the stationary contact 72 as shown in solid lines in FIG. 2 when the air pressure in the pressure chamber 50 is at a lower value and a second position to engage the movable contact 82 with the stationary contact 72 as shown in phantom lines in FIG. 2 when the air pressure in the pressure chamber 50 is at a higher value which may be a normal pressure for the tire 10. The flange 61 of the bracket 56 is in abutting engagement with the top 84 of the curved section 80 so that the bracket 56 pushes the leaf spring 76 down in the drawing to deform or deflect the leaf spring 76 from the first position toward the second position against the resilient force of the leaf spring 76 when the diaphragm 46 is deformed downward in accordance with the increases in the air pressure in the tire 10. The resilient force of the leaf spring 76 acts to return the leaf spring 76 from the second position toward the first position in response to movements of the bracket 56 when the diaphragm 46 is returned upward in the drawing in accordance with the lowerings in the air pressure in the tire 10.

Figure 3:
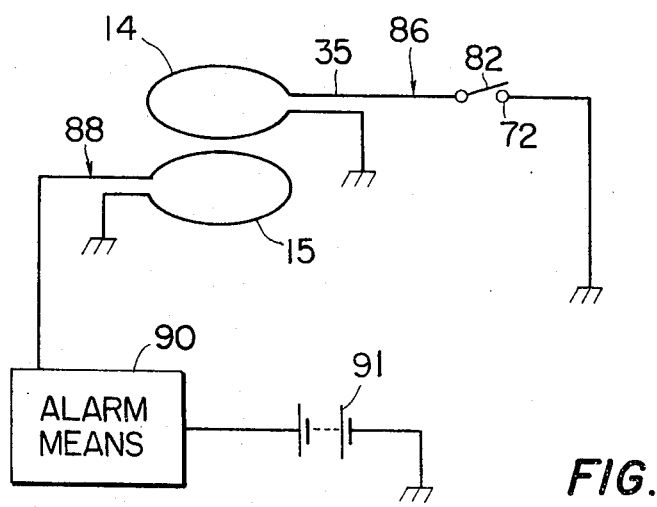
FIG. 3 is a schematic diagram of an electric wiring circuit of a tire pressure sensing device according to the invention.

Referring to FIG. 3, there is shown a first electric wiring circuit 86 having the stationary and movable contacts 72 and 82 and the movable coil 14, and a second electric wiring circuit 88 having the stationary coil 15 connected to the ground, alarm means 90 and a source 91 of electric power such as a battery connected to the ground. The stationary contact 72 is electrically connected to the movable coil 14 through the screw 74, casing 17 and rim 12 as shown in FIG. 2 which each are made of electric conductive materials. The movable contact 82 is electrically connected to the movable coil 14 through the leaf spring 76, bracket 56, plates 58 and 60, loop spring 62, rod 32 and wire 35 as shown in FIG. 2 which each are made of electric conductive materials. Disengagement of the stationary and movable contacts 72 and 82 opens the first electric wiring circuit 86 to cause the stationary coil 15 to produce a signal. The alarm means 90 produces an alarm signal in response to the signal from the stationary coil 15 to indicate that the air pressure in the tire 10 is below the normal value and that the tire 10 must be supplied with a supplementary pressurized air until the air pressure in the tire 10 is increased to the normal value. The alarm means 90 may be a buzzer or a warning lamp which provides an aural or visual indication. Engagement of the stationary and movable contacts 72 and 82 when the air pressure in the tire 10 is not lower than the normal value closes the first electric wiring circuit 86 to cause the stationary coil 15 to produce no signal.

When, in operation, the air pressure in the tire 10 is not lower than the normal value, the leaf spring 76 is held in the second position to engage the movable contact 82 with the stationary contact 72 by the bracket so that the alarm means 90 produces no alarm signal. When the air pressure in the tire 10 falls below the normal value, the leaf spring 76 returns from the second position to a position to disengage the movable contact 82 from the stationary contact 72 by its resilient force in accordance with the displacement of the bracket 56 toward the cover plate 38 so that the alarm means 90 produces an alarm signal to indicate the necessity of air supply into the tire 10. When the air pressure in the tire 10 is increased to the normal value by supplement of air into the tire 10, the bracket is moved toward the rim 12 in accordance with an increase in the air pressure in the tire 10 to bend the curved section 80 of the leaf spring 76 counterclockwise in the drawing about a point 92 to the second position. The curved section 80 thus bent turns the flat section 78 clockwise about a fulcrum 94 to the second position to engage the movable contact 82 with the stationary contact 72 so that the alarm means 90 ceases to produce the alarm signal. Thus, the supply of air into the tire 10 is stopped.

When a vehicle equipped with the tire 10 moves at high speeds, the diaphragm 46 is biased toward the cover plate 38 by a centrifugal force acting on the bracket 56. As a result, even if the air pressure in the tire 10 is at the normal value, the leaf spring 76 is held in a position to disengage the movable contact 82 from the stationary contact 72 but not in the second position by the bracket 56 so that the alarm means 90 produces an alarm signal to indicate the need of air supplement into the tire 10 until the air pressure in the tire 10 reaches a predetermined value higher than the normal value. Thus, the tire 10 is prevented from bursting owing to a standing wave phenomenon. When the air pressure in the tire 10 reaches the predetermined value, the leaf spring 76 is deformed to the second position to engage the movable contact 82 with the stationary contact 72 by the bracket 56 so that the alarm means 90 ceases to produce the alarm signal. A normal pressure for the tire 10 can be raised to desired values corresponding to high vehicle speeds by selecting the weight of the bracket 56 at a suitable value.

Figure 4:
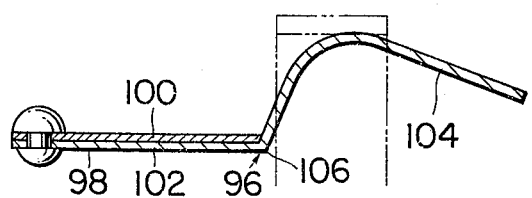
FIG. 4 is a schematic cross sectional view of another example of a leaf spring forming part of a tire pressure sensing device according to the invention.

Referring to FIG. 4, there is shown a leaf spring 96 which differs from the leaf spring 76 as shown in FIG. 2 in that it includes a bimetallic flat section 98. The flat section 98 has two members 100 and 102 overlapping one another and made of materials having different coefficients of thermal expansion such as, for example, brass and steel. The two members 100 and 102 may be welded or bonded together. The member 100 having the greater coefficient of thermal expansion is arranged adjacent to the cover plate 38 while the member 102 having the lesser coefficient of thermal expansion is arranged adjacent to the diaphragm 46, if the leaf spring 96 is employed in the tire pressure sensing device 13 as shown in FIG. 2 in lieu of the leaf spring 76. A curved section 104 is made of a material similar to that of the member 102. In the tire pressure sensing device 13 employing the leaf spring 96 in place of the leaf spring 76, when the temperature of air in the tire 10 is higher than a predetermined value, the member 100 is expanded greater than the member 102 by the heat of air in the tire 10 to bend the flat section 98 downwardly in the drawing about a point 106 so that even if the air pressure in the tire 10 is at the normal value, the leaf spring 96 is held in a position to disengage the movable contact 82 from the stationary contact 72 but not in the second position by the bracket 56. Thus, the alarm means 90 produces an alarm signal to indicate an abnormal or undesirable rise in the temperature of air in the tire 10.

It will be thus understood that the invention has pronounced features or advantages in that switch means susceptibly and securely responds to a fall or a rise of air pressure in a tire below or to a normal value to produce or cease to produce an alarm signal, because a snap action of a leaf spring is employed for controlling the switch means, in that an alarm signal is produced to prevent the tire from bursting during vehicle movements at high speeds, even if the air pressure in the tire is at the normal value, because the leaf spring for controlling the switch means is controlled in accordance with a centrifugal force, in that an alarm signal is produced to indicate a undesirable rise in the tire operating temperature, even if the air pressure in the tire is at the normal value when the temperature of air in the tire exceeds a predetermined value, by employing a leaf spring having a bimetallic flat section, and in that contact members of the switch means are prevented from creating a spark upon engagement of the contact members and from rusting to lengthen its durability, because the contact members are disposed in a pressurized air chamber of the tire to be kept from foreign substances such as moisture and dust in the outside atmosphere.

Although the stationary and movable contacts 72 and 82 are constructed and arranged to engage each other when the air pressure in the tire 10 is higher than the normal value in the embodiment of FIG. 2, the stationary and movable contacts may be constructed and arranged to engage each other upon a fall in the air pressure in the tire 10 below the normal value.

What is claimed is:

1. A tire pressure sensing device adapted to sense a fall in the pressure in a tire below a predetermined value, comprising a casing disposed in a pressure chamber of said tire and fixedly mounted on a wheel rim cooperating with said tire, a flexible diaphragm dividing said casing into an atmospheric chamber vented to the atmosphere and a pressure chamber communicating with said pressure chamber of said tire, said diaphragm being deformable in response to the pressures in said pressure chamber of said casing, a stationary contact disposed in said pressure chamber of said casing, a leaf spring disposed in said pressure chamber of said casing and supported by said casing, said leaf spring being deformable in response to movements of said diaphragm, a movable contact fixedly mounted on said leaf spring and engageable with said stationary contact, in which said casing has formed on one end thereof a projection extending outwardly of said pressure chamber of said tire through said rim and is fixedly mounted on said rim through said projection, said projection having a passage for communicating said atmospheric chamber with the atmosphere, in which said leaf spring comprises a flat section rockably supported by said casing and a curved section connected at one end thereof to said flat section and supported at the other end thereof by said casing, said curved section engaging said diaphragm through a bracket, said movable contact being mounted on said flat section, in which said flat section of said leaf spring comprises two members made of materials having different coefficients of thermal expansion.

2. A tire pressure sensing device adapted to sense a fall in the pressure in a tire below a predetermined value, comprising a casing disposed in a pressure chamber of said tire and fixedly mounted on a wheel rim cooperating with said tire, a flexible diaphragm dividing said casing into an atmospheric chamber vented to the atmosphere and a pressure chamber communicating with said pressure chamber of said tire, said diaphragm being deformable in response to the pressures in said pressure chamber of said casing, a stationary contact disposed in said pressure chamber of said casing, a leaf spring disposed in said pressure chamber of said casing and supported by said casing, said leaf spring being deformable in response to movements of said diaphragm, a movable contact fixedly mounted on said leaf spring and engageable with said stationary contact, in which said casing has formed on one end thereof a projection extending outwardly of said pressure chamber of said tire through said rim and is fixedly mounted on said rim through said projection, said projection having a passage for communicating said atmospheric chamber with the atmosphere, in which said leaf spring comprises a flat section rockably supported by said casing and a curved section connected at one end thereof to said flat section and supported at the other end thereof by said casing, said curved section engaging said diaphragm through a bracket, said movable contact being mounted on said flat section, further comprising a cover plate fixedly secured to said casing to close an opening formed at the other end thereof, said cover plate having formed therethrough a hole for communicating said pressure chamber of said casing with said pressure chamber of said tire, and in which said flat and curved sections of said leaf spring are carried by said cover plate through first and second posts, respectively, further comprising an electrically conductive rod extending through said projection and electrically insulated from said casing and said projection, said passage of said projection being formed through said rod, a movable coil disposed exteriorly of said pressure chamber of said tire and fixedly mounted on said rim, said movable coil being electrically connected to said stationary contact through said rim and said casing and to said movable contact through a conducting wire, said rod, said bracket and said leaf spring, a stationary coil fixedly mounted on a stationary part of a vehicle body and opposite to said movable coil, and alarm means connected to said stationary coil, in which said alarm means produces an alarm signal when said movable contact is disengaged from said stationary contact, in which said flat section of said leaf spring has a free end and said movable contact is fixedly carried on said free end of said flat section, said movable contact engaging said stationary contact when the pressure in said tire is higher than a predetermined value, in which said flat section of said leaf spring comprises first and second members overlapping one another, said first member being positioned adjacent to said cover plate, said second member being positioned adjacent to said daiphragm and having a coefficient of thermal expansion lesser than that of said first member.

3. A tire pressure sensing device for sensing a fall in the pressure in a tire below a predetermined value, comprising a casing disposed in an air chamber of the tire and fixedly mounted on a wheel rim on which the tire is mounted, a pressure sensitive member dividing the interior of said casing into a pressure chamber communicating with said air chamber of the tire and an atmospheric chamber vented to the outside atmosphere, said pressure sensitive member being movable in response to variations in the pressure in said pressure chamber, a leaf spring disposed in said pressure chamber, said pressure sensitive member being connected to said leaf spring to cause said leaf spring to move in accordance with movement of said pressure sensitive member, switch means actuated by movement of said leaf spring to produce an electric signal when the pressure in said pressure chamber falls below a predetermined value, said leaf spring having a portion made of two members which overlap one another and which have respectively coefficients of thermal expansion different from each other to deform said leaf spring to cause said leaf spring to actuate said switch means to produce an electric signal when the temperature of the pressure chamber exceeds a predetermined level.

4. A tire pressure sensing device as claimed in claim 3, further comprising a member connecting said pressure sensitive member and said leaf spring to cause said leaf spring to move in accordance with movement of said pressure sensitive member, in which said connecting member having a weight which produces a centrifugal force to move said pressure sensitive member to cause said leaf spring to actuate said switch means to produce an electric signal when the speed of the vehicle exceeds a predetermined level.

* * * * *